April 28, 1942.  E. L. HARDER  2,280,950
PILOT WIRE SYSTEM WITH MEANS FOR NEUTRALIZING INDUCED VOLTAGES
Filed May 13, 1941  2 Sheets-Sheet 1
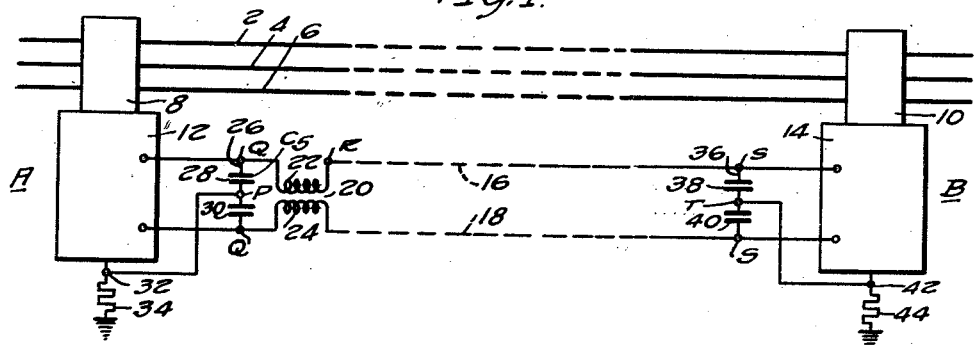
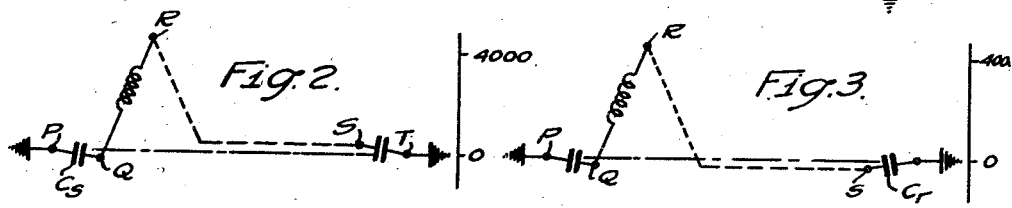
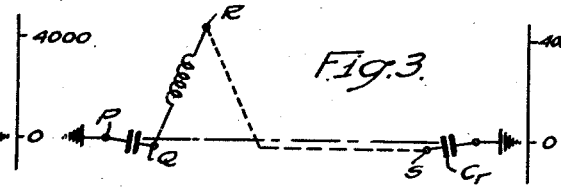
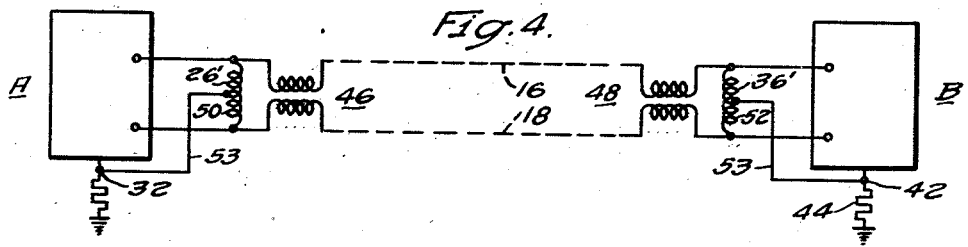
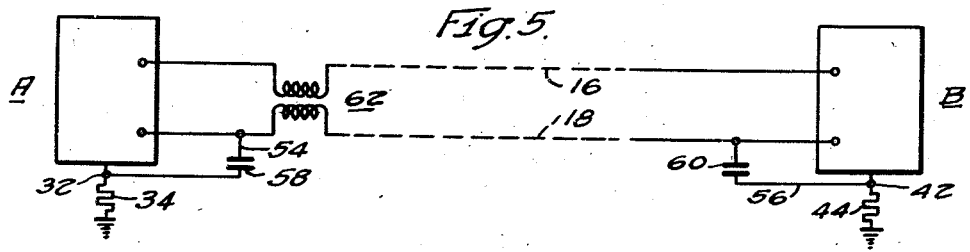
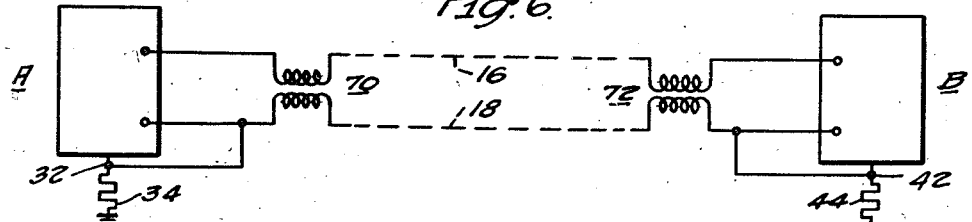
WITNESSES:
E. A. Millay
B. L. ———
INVENTOR
Edwin L. Harder.
BY O. D. Buchanan
ATTORNEY April 28, 1942.   E. L. HARDER   2,280,950
PILOT WIRE SYSTEM WITH MEANS FOR NEUTRALIZING INDUCED VOLTAGES
Filed May 13, 1941   2 Sheets-Sheet 2
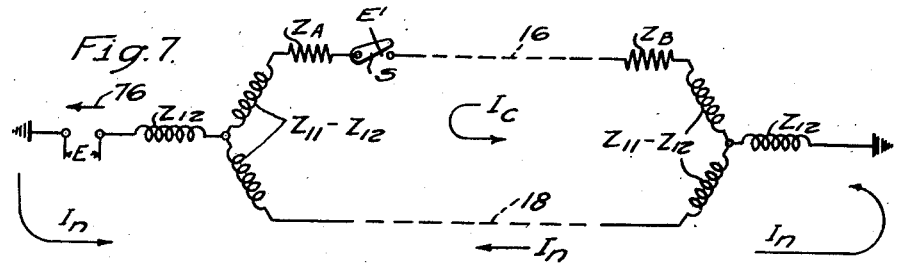
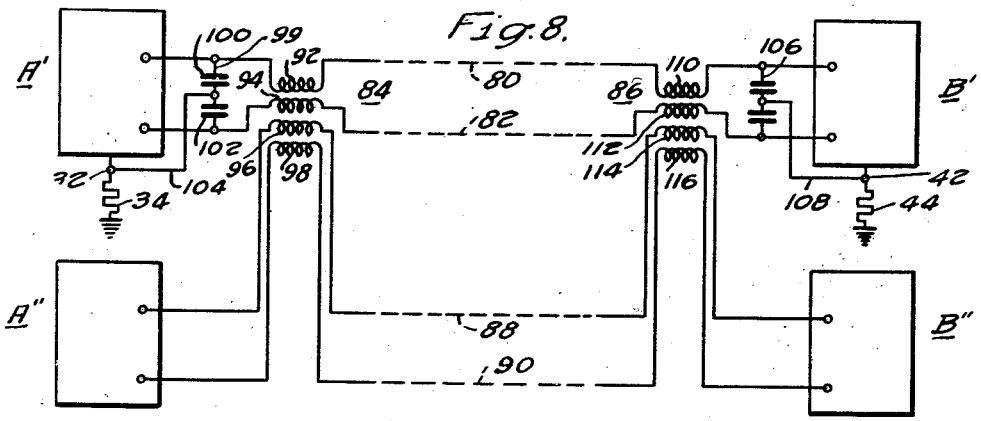
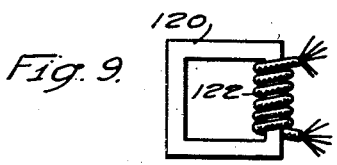
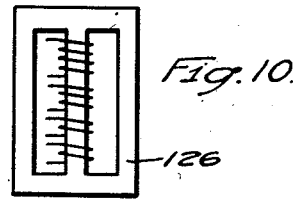
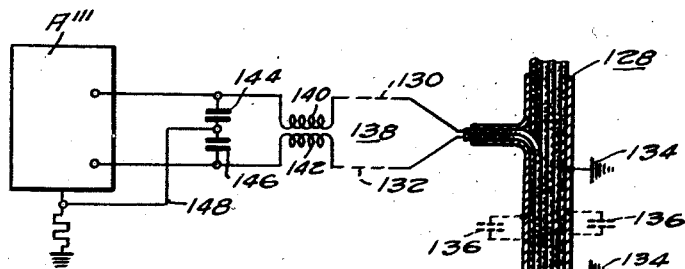
WITNESSES:
E. A. McCloskey
B. L. Zangwill
INVENTOR
Edwin L. Harder
BY O. B. Buchanan
ATTORNEY Patented Apr. 28, 1942

2,280,950

UNITED STATES PATENT OFFICE 2,280,950

PILOT WIRE SYSTEM WITH MEANS FOR NEUTRALIZING INDUCED VOLTAGES

Edwin L. Harder, Forest Hills, Pa., assignor to Westinghouse Electric & Manufacturing Company, East Pittsburgh, Pa., a corporation of Pennsylvania Application May 13, 1941, Serial No. 393,184

22 Claims. (Cl. 171—97)

This invention is generally directed to the provision of means for reducing the deleterious effects of longitudinal in-phase voltages produced extraneously in wires, such as, for example, pilot wires, connecting separated terminal or station apparatus; pilot wires being a general term for metallic communicating wires through which signal current is passed for relaying, control, communication, supervision, or other similar purposes.

Extraneous in-phase voltages, produced either by induction from outside wires or by a difference in the potential of the terminals connected by the pilot wires with respect to true ground, may produce injurious voltages between the pilot wires or the terminal equipment and ground, or may disturb the signalling function of the pilot wires, and even cause false operations of the signalling system if the signalling system be a protective relaying system, or the like. These objectionable voltages might result, for example, from a fault or varying load-current in a power line in proximity to, or paralleling all or a part of the pilot wires, in which case the induced voltages might be relatively evenly distributed over the whole or a substantial part of the length of the pilot wires, or may be concentrated at some particular section of the pilot wires, or may be otherwise distributed.

Different ground potentials of the stations connected by the pilot wires, caused, for example, by heavy currents through grounding impedances at one or more of the stations, also produce longitudinal in-phase voltages which are, however, at some phase angle with respect to the induced voltages, if both should be simultaneously produced. In such cases, neglecting the lateral voltage or voltages in the pilot wire channel used for a particular signalling function, the extraneously-produced voltages due to difference in ground potentials are vectorially added to the magnetically induced voltages, and if the grounding impedance or impedances are essentially pure resistance, the angle between the voltage vectors may be 90°.

In my copending application, Serial No. 212,451, filed June 8, 1938, and entitled "Pilot wire neutralization," which has matured into Patent No. 2,248,705 of July 8, 1941, I have disclosed and claimed means for reducing the deleterious effects of extraneously-produced voltages in a signalling system including a pilot wire channel. In that application balanced or symmetrical systems were disclosed as the preferred embodiments of my invention, such systems being more or less of general utilization. In those preferred embodiments, the equipment for neutralizing the longitudinal in-phase voltages, extraneously produced, was symmetrically arranged with corresponding parts having essentially the same electrical constants. Consequently, those embodiments disclosed neutralizing systems which were both balanced and symmetrical, by balanced meaning that the neutralizing elements with respect to each wire are alike, and by symmetrical meaning that the neutralizing elements with respect to each terminal, are alike.

However, it is possible, and frequently desirable, in many particular instances to utilize somewhat simpler means, including unbalanced and unsymmetrical arrangements, which requires less equipment, or has some especial feature making it adaptable to pilot wire channels which may, for example, require the isolation of one or more of the pilot wires from ground, or may require the grounding of both ends of one of the pilot wires, or may have other special requirements. By means of the instant invention, I disclose how such advantages might be obtained in a pilot wire neutralization means which will have these and other advantages, together with one or more of the advantages described in greater detail in my aforesaid earlier application, including the important advantage of eliminating the extra wire of prior neutralizing systems utilizing a neutralizing transformer or transformers, which wire, in such prior systems, served to provide a current-flow path for exciting current for magnetizing the neutralizing transformer or transformers, but served no signalling function.

In general, the modifications described herein operate on the general principles disclosed in my aforesaid application, that is, back-voltages are introduced in the pilot wires which substantially neutralize the extraneously produced in-phase voltages, the back-voltages being created in one or more neutralizing transformers which are magnetized by a small exciting current-flow through the pilot wires which are also used for transmitting signalling current.

The principles and operation of my instant invention will be better understood after a consideration of the following description thereof, bearing in mind, if necessary, my aforesaid application. This description is to be taken in conjunction with the accompanying schematic wiring diagrams, in which:

Figure 1 is a view diagrammatically illustrating a form of my invention in which two separated stations or terminals, hereafter designated as terminals, are interconnected by a pair of pilot wires having means for neutralizing extraneously-produced in-phase voltages, which means is a balanced system which includes but a single neutralizing transformer;

Fig. 2 is a graphic view intended to depict the voltage distribution on the pilot wire channel of Fig. 1 with the resistance of the pilot wires and the pilot wire distributed capacitance to ground considered negligible;

Fig. 3 is a graphic view, similar to Fig. 2, in which the pilot wire distributed capacitance to ground is taken into consideration.

Fig. 4 is a view diagrammatically illustrating a balanced form of a pilot-wire channel utilizing only balance-coils for completing the current-flow path for the exciting current for the neutralizing transformer or transformers.

Figs. 5 and 6 are views of further modified forms of my invention in which one of the pilot wires is isolated from ground. In Fig. 5 the terminal ends of the other pilot wire are grounded through small grounding-capacitors, whereas in Fig. 6 the terminal ends of the other pilot wire are connected to be at terminal ground potential;

Fig. 7 is the equivalent electrical diagram of the pilot wire channel of Fig. 6;

Fig. 8 is a view diagrammatically illustrating a pilot wire signalling system having a plurality of pairs of signalling pilot wires, in which one pair is utilized for current-flow for exciting a neutralizing transformer or transformers having windings connectible in the other pairs of signalling pilot wires so that these can be isolated from ground;

Figs. 9 and 10 are views illustrating types of neutralizing transformers utilizable in any of the embodiments of my invention; and Fig. 11 is a schematic view of a system somewhat similar to Fig. 1, showing an application of my invention to a pilot wire signalling system in which the pilot wires are encased in a grounded metallic sheath, a pair of the wires, constituting the pilot wires, having been taken therefrom for connection to a terminal.

Fig. 1 represents one embodiment of my invention in which a pair of pilot wires are utilized to interconnect two terminals having protective equipment for protecting a section of electrical apparatus, in this case a three-phase power-transmitting line. The three-phase power-transmitting line comprises line-conductors 2, 4 and 6 extending between, and perhaps beyond, a pair of spaced terminals A and B, respectively. Converting means 8 at the terminal A and 10 at the terminal B convert electrical line-quantities into suitable representative quantities for application to relaying equipment 12 at terminal A and 14 at terminal B, the relaying equipment being interconnected by a pair of pilot wires 16 and 18, respectively. The broken lines in the line-conductors 2, 4 and 6 and in the pilot wires 16 and 18 are indicative of extended lengths thereof.

The converting means may comprise suitable devices, such as the current transformers and connections shown in my aforesaid application or in my Patent No. 2,183,646, issued December 19, 1939, and the terminal equipment may take any appropriate form, such as, for example, the protective relaying means and circuit-interrupting devices shown in my aforesaid application and patent. However, the application of the invention shown herein is not limited to the specific forms of converting means and terminal apparatus, and may be applied, generally, to other suitable communicating wire channels, or the like.

In order to reduce the effects of longitudinal voltages produced in the pilot wires 16 and 18 in the same direction, the embodiment of Fig. 1 includes a neutralizing transformer 20 near one of the terminals, in this case, the terminal A; the neutralizing transformer having a winding 22 in the pilot wire 16 and a winding 24 in the pilot wire 18, the windings being mutually closely coupled in accordance with common practice in the construction of neutralizing transformers. A bridging circuit-path 26 is connected across the pilot wires between the neutralizing transformer and the terminal equipment 12, this bridging circuit-path comprising two serially-connected capacitors 28 and 30, preferably of equal capacitance for a balanced arrangement. The midpoint of this bridging path, between the two capacitors, is connected, preferably directly, to the terminal ground 32 at station A. A grounding means 34 completes the path to ground, this grounding means representing the terminal grounding impedance.

A second bridging circuit-path 36 is connected across the pilot wires near the terminal B. This bridging circuit-path 36 also comprises two serially-connected capacitors 38 and 40, preferably of equal capacitance. The midpoint of this bridging circuit-path is connected, preferably directly, to the terminal ground 42 at the terminal B, the terminal being grounded through a grounding means 44 which completes the path to ground, this grounding means representing the terminal grounding impedance.

Terminal grounding means is the interconnected grounded conductors, steel framework, and the like, to which circuit conductors are connected for grounding and which, in turn are connected to plates or conductors buried in the ground or to suitable water pipes, or to both. Terminal grounding means, such as represented by 34 and 44, are the equivalent of resistors of low value, but in some cases may have an impedance which for practical purposes is almost equal to zero, indicating substantially perfect grounding.

The embodiment of Fig. 1 utilizes only one neutralizing transformer and thereby differs from the symmetrical embodiments shown in my prior aforesaid application, in which the neutralizing means at each terminal is the same. However, the circuit of Fig. 1, will be effective to reduce any remnant voltages between the ends of the pilot wires and ground, these remnant voltages being the voltage across the capacitors 28, 30, 38 and 40.

When a longitudinal voltage is induced in a pilot wire, which has distributed capacity, the voltage to ground rises at one end and tends to go below ground potential at the other end. If we assume that the pilot wire is isolated from ground, that is, there are no terminal connections to ground, then the average of the voltages to ground of all points on the pilot wire, is zero. A grounded capacitor connected to one end of the pilot wire will tend to bring that end closer to ground potential, and a grounded reactor-capacitor series combination at the other end, having a net inductive effect, will tend to increase the voltage to ground at that end. Fig. 2 represents a limiting condition of these effects with an induced voltage concentrated at one end and terminal grounding impedances predominant with respect to the total distributed capacitance of the pilot wire, and Fig. 3 represents an intermediate condition where the total distributed capacitance of the pilot wire is significant.

Figs. 2 and 3 symbolically represent, in a general manner, the voltage along a pilot wire under an assumed uncommonly high induced voltage of 4,000 volts; in the first case with the pilot wire resistance and the pilot wire distributed capacitance to ground considered negligible, and in the second case with the pilot wire resistance considered negligible but with the pilot wire distributed capacitance of some small value which is usually in the order of .1 microfarad per mile between pilot wires or between a pilot wire and the sheath and other wires, which are grounded, of a metal clad cable containing the pilot wires. The induced voltage is assumed to be concentrated near the terminal A, and it may be observed that the back voltage neutralizing the induced voltage is substantially concentrated in the neutralizing transformer windings which, in Fig. 2 reduce the remnant voltage between the points Q and P, representative of the remnant voltage at the terminal end A of a pilot wire. The voltage with respect to ground on a pilot wire is very close to ground potential along the remainder of its length, which is substantially its full length, and the remnant voltage at the terminal B, between the terminal and pilot wire point S on the one hand, and the terminal ground point T or 42, on the other, is also the voltage across the respective capacitors 38 and 40. The distributed capacitance of the pilot wires tends to bring the voltage between the extended length of a pilot wire and ground and between the terminal point S and the terminal ground point T, towards or below the zero or ground potential line, as indicated in Fig. 3, whereas, with the distributed capacitance of the pilot wires ignored, these voltages are above the zero or ground potential line.

A general equation for determining the remnant voltages to ground in a system such as shown in Fig. 1 and including all factors is somewhat involved, as indicated in my aforesaid application, but the manner in which the problem is attacked can be more simply shown by assuming that the windings 22 and 24 have the same electrical constants, that the capacitors 28 and 30 are equal, and that the capacitors 38 and 40 are also equal so that the system is a balanced one, that is, a system in which substantially the same exciting current flows through each pilot wire. Assuming that the pilot wire resistance and the pilot wire distributed capacitance to ground is negligible, and that Z is the self-impedance of one winding of the neutralizing transformer with the other winding open; M is the mutual impedance of the neutralizing transformer; $z$ is the capacitive reactance of each of the capacitors 28 and 30; and $z'$ is the capacitive reactance of each of the capacitors 38 and 40; and further assuming that the impedance of each of the terminal grounding impedances 34 and 44 is negligible and that the induced longitudinal voltage has a value E in the loop including either one of the pilot wires and a ground return, then in accordance with Kirchoff's law, $$0 = E - Iz - Iz' - IZ - IM \quad (1)$$

Solving for I, the current in this loop, and which is the same for either pilot wire because the system is balanced, $$I = \frac{E}{Z + M + z + z'} \quad (2)$$

Assuming $Iz = e_{PQ}$, the remnant voltage across the points Q and P, and that $Iz' = e_{ST}$, the remnant voltage across the points S and T, then from Equations 1 and 2

$$e_{PQ} = E \frac{z}{Z + M + z + z'} \quad (3)$$

and $$e_{ST} = E \frac{z'}{Z + M + z + z'} \quad (4)$$

If $z$ and $z'$ are equal, that is all capacitors are of the same reactance, and M is substantially equal to Z, which is the case in a neutralizing transformer, then $$e_{PQ} = e_{ST} = E \frac{z}{2Z + 2z} \quad (5)$$

In a practical embodiment where Z is equal to 100,000 ohms inductive and $z$ is equal to 1000 ohms capacitive, the remnant voltage $e_{PQ}$ and $e_{ST}$ would each be equal to $$E \frac{1,000}{198,000} = \frac{E}{198}$$

ample protection even with an induced voltage of even as much as 4,000 volts.

In some instances, it is desirable to avoid the use of capacitors in the bridging circuit-paths, and such an embodiment is indicated in Fig. 4 in which balance-coils are utilized instead. In the embodiment shown in Fig. 4 and in other embodiments subsequently described, the power line-conductors and terminal equipment have been omitted in the interests of clarity and simplicity. In this embodiment of Fig. 4, which is a balanced symmetrical arrangement, two neutralizing transformers 46 and 48 are utilized at the respective terminals A and B, the bridging circuit-paths 26' and 36' comprising balanced coils 50 and 52, respectively, having midpoints grounded, as indicated at 32 and 42, to the terminal ground by ground branch circuits 53. Such a pilot wire channel is particularly useful where the pilot wires are used to transmit alternating-current signalling current having relatively high frequencies, such as for example, but not by way of limitation, audio frequencies. If capacitors were used an appreciable part of the signalling current would be by-passed thereby undesirably reducing the signalling current over the pilot wires.

It is also possible to eliminate bridging circuit-paths between the pilot wires by isolating one of the pilot wires, except for its connections to the terminal equipment, and utilizing the other pilot wire in a grounded branch circuit which conducts exciting current for magnetizing the neutralizing transformer or transformers. Such embodiments are disclosed in Figs. 5 and 6.

In Fig. 5 each end of one of the pilot wires, assumed to be the pilot wire 18, is provided with grounding means comprising a grounding branch circuit 54 at the terminal A and a grounding branch circuit 56 at the terminal B. These grounding circuits include relatively small grounding-capacitors 58 and 60, respectively. This embodiment utilizes only one neutralizing transformer 62 and a total of two capacitors, as distinguished from a greater number of transformers and capacitors in other embodiments, particularly embodiments having balanced arrangements.

In Fig. 6, capacitors have been entirely eliminated, with one of the pilot wires, assumed to be the pilot wire 16, maintained isolated from ground except for its connections to terminal equipment. In this instance, the other pilot wire 18 has its terminal ends directly grounded. However, two neutralizing transformers 70 at the terminal A and 72 at the terminal B, have their respective windings connected in each of the respective pilot wires. Systems of this kind are workable in many special applications, and may lower the remnant voltages to ground, but may introduce a slight remnant loop voltage which might cause a circulating current in the pilot wire loop. However, by a proper choice of constants, this remnant loop voltage can be kept to negligible proportions. This is mathematically shown with reference to Fig. 7 which is an equivalent diagram of the pilot wire channel of Fig. 6, and by analyzing this equivalent diagram in the same manner as the system of Fig. 1 was analyzed and also the system more particularly analyzed in my aforesaid application, it may be shown that this is the case.

Thus, assuming that the distributed capacitance of the pilot wire to ground is negligible and considering the ground loop including the pilot wire 18, current $I_n$ flows in the direction indicated by the arrows, for an induced voltage E in the pilot wires 16 and 18 having the direction indicated by the arrow 76, and in this loop $$E - 2I_n Z_{12} - 2I_n(Z_{11} - Z_{12}) - I_n R + 2I_c(Z_{11} - Z_{12}) + I_c R = 0 \quad (6)$$

Considering the ground loop embracing the pilot wire 16, $$E - I_c(Z_A + Z_B) - 2I_c(Z_{11} - Z_{12}) - I_c R - E' - 2I_n Z_{12} = 0 \quad (7)$$

where $Z_{11}$ is the self-impedance of each winding of the neutralizing transformer with the other winding open; $Z_{12}$ is the mutual impedance of the neutralizing transformer; R is the resistance of each pilot wire, which are assumed equal; $Z_A$ and $Z_B$ are the terminal impedances of the terminal equipment at the terminals A and B, respectively, as viewed from the pilot wires and include the means for providing signal current flow over the pilot wires.

For solving these circuit equations, we may assume a switch s inserted in one of the pilot wires, and the voltage E' across this switch when opened will represent the remnant loop voltage.

When the switch s is opened, $I_c$ is necessarily equal to zero so that from Equation 6

$$I_n = \frac{E}{2Z_{11} + R} \quad (8)$$

and from Equation 7

$$E' = E - 2I_n Z_{12} \quad (9)$$
$$= E\left(1 - \frac{2Z_{12}}{2Z_{11} + R}\right)$$
$$= E\left(\frac{2Z_{11} + R - 2Z_{12}}{2Z_{11} + R}\right)$$

or $$E' = E\left(\frac{Z' + R}{2Z_{11} + R}\right) \quad (10)$$

where Z' equals $2(Z_{11} - Z_{12})$ which is the leakage impedance of a neutralizing transformer. In neutralizing transformers, Z' may vary from 2 to 6 times the resistance $R_n$ of each winding thereof, which resistances are very nearly equal. In some transformers a slight leakage reactance may also affect the value of Z', but this factor is generally negligible. Typical values of a practical embodiment for a 10 mile pilot wire channel of No. 16 wire, utilizing the system of Fig. 6 are R=220 ohms; $R_n$=80 ohms per winding; $Z_{11}$=100,000 ohms and Z'=2 to 6 times 80, assuming Z'=2×80 or 160 ohms, then since R can be ignored with respect to $2Z_{11}$ $$E' = \frac{380}{200,000} E$$

With an induced voltage of as much as 2,000 volts, E', the remnant loop voltage, is 3.8 volts. If the terminating terminal impedances $Z_A$ and $Z_B$ are equal, the remnant loop voltage will divide equally at the two ends of the pilot wire channel. With a working signal voltage of from 10 to 15 volts or more, that is, of course, negligible. Thus, it is practical in many cases to use an unbalanced arrangement in which grounding-capacitors are eliminated so that the ends of one of the pilot wires are kept at terminal ground potential, which would be true ground if the terminal grounding impedances 34 and 44 are substantially zero. This means that the remnant voltages between the terminal equipment and ground are zero on the grounded pilot wire and would be approximately $$\frac{E'}{2}$$

or 1.9 volts on the other pilot wire in the example worked out. In other words, the protection is superior, from a remnant voltage to ground standpoint as compared to a balanced circuit with capacitors.

If capacitors are used in the connetcions to terminal grounds, such as, for example, the capacitors 58 and 60, substantially the same remnant voltages will occur as if the same total capacity were in a bridging circuit-path, and were divided from the two wires to ground, that is, grounding means including grounding-capacitors from one wire only is equivalent to bridging circuit-paths across the pilot wires, of the same total capacitance. If capacitors are used in place of the solid grounded connections of Fig. 6, having capacitances such that the remnant voltages to ground are not over 5% of the induced voltage, then the remnant loop voltage E' will not be over 5% greater than the value obtained by Equation 10, that is, about 4 volts instead of 3.8 volts in the example chosen.

In general, where remnant loop voltages are to be eliminated, it is desirable to use balanced arrangements utilizing symmetrical grounding means from each end of each of the pilot wires, but in instances where slight remnant loop voltages can be tolerated, unbalanced schemes such as those described can be used with a resulting savings in the cost of the equipment, and as shown for the specific example of the system of Fig. 6, with smaller remnant ground voltages. The advantage of the unbalanced system lies in the fact that one of the wires may be isolated from ground and also that one of the wires can be maintained very close to, or substantially at, ground potential.

It is sometimes desirable to completely isolate from ground the pilot wires of a signalling channel, and in such cases a system such as shown in Fig. 8 can be used. In this figure, neutralizing transformers are provided having a plurality of pairs of windings, all mutually closely coupled together, and each pair associated with a pair of pilot wires. One of the pairs of pilot wires is connected to provide current-flow paths for exciting current for magnetizing the neutralizing transformer, so that back-voltages are induced in all of the windings. Since the back-voltages in accordance with my invention are of a magnitude substantially to neutralize the extraneously-produced longitudinal voltages, it is apparent, therefore, that the latter can be practically neutralized by such back-voltages if they can be introduced in the isolated pilot wire.

In Fig. 8, pilot wires 80 and 82 connected between terminals A' and B' are provided with any suitable neutralizing connections which may be along the lines previously described, or such as described in my aforesaid application. The particular embodiment shown is along the lines of that shown in my aforesaid application and comprises a pair of neutralizing transformers 84 and 86 at the respective terminal ends at the pilot wires, each neutralizing transformer comprising as many pairs of windings as there are pilot wire channels in which the effects of the longitudinal in-phase voltages are to be limited. In the particular modification shown, one additional pilot wire channel, including pilot wires 88 and 90, is shown but similar pilot wire channels can be added.

The neutralizing transformer 84 is provided with windings 92 and 94 in the respective pilot wires 80 and 82, and windings 96 and 98 in the respective wires 88 and 90. The terminal side of the windings 92 and 94 are provided with a bridging circuit-path 99 including small grounding capacitors 100 and 102, serially connected. These capacitors are preferably of equal capacitance, and the midpoint of the bridging circuit-path is grounded through a connection 104. A similar bridging circuit-path 106 and grounding conductor 108 are provided at the terminal side of windings 110 and 112 of the neutralizing transformer 86, these windings being in the respective pilot wires 80 and 82. The transformer 86 has additional windings 114 and 116 in the respective pilot wires 88 and 90.

The pilot wires 88 and 90 run between terminal apparatus A'' and B'' and are isolated from ground at least to their connection points to the terminal equipment.

In the operation of the system shown in Fig. 8, each of the wires 80 and 82 is part of the circuit means for the small exciting currents flowing through the respective grounding-capacitors near each end of the wires, and these currents will induce the necessary back-voltages in the neutralizing transformer windings for minimizing the effects of the longitudinal voltages produced in the pilot wires 80, 82, 88 and 90 by some external effect.

Neutralizing transformers for use in my invention can be of customary form, and are generally well known. However, in Figs. 9 and 10, I illustrate two forms of neutralizing transformers useful for systems such as that of Fig. 8. In Fig. 9 one leg of a closed magnetic core 120 is provided with a winding 122 consisting of a cable comprising a plurality of insulated wires, shown as comprising six insulated wires. Consequently, in effect, the winding 122 provides six separate closely coupled windings which can be connected in a neutralizing system in any desired manner.

Fig. 10 indicates another form of neutralizing transformer in which each winding is separated, that is, insulated from the other windings on a leg of the magnetic core 126. This form of neutralizing transformer might be preferred in cases in which it is desired to provide a slightly greater insulation between the turns of each winding, but introduces a slightly greater leakage reactance factor in the mathematical analyses of the neutralized circuit. This factor, however, is generally negligible in comparison with the high self-impedance and mutual impedance of the windings.

In accordance with the disclosure in my aforesaid application, the induced voltages are, of course, alternating so that the mathematics analyzing such circuits comprise vectorial quantities. Because of the high impedance of the neutralizing transformer, the pilot wire resistance and their distributed capacitance to ground are generally negligible in computing the neutralizing effect of my novel systems and can be ignored for most engineering applications. However, in some instances, the distributed capacitance of a long cable can be utilized as part of the neutralizing scheme, as shown, for example, in Fig. 11 in which a long metal-sheathed cable 128 comprises a number of telephone wires, one pair of which, comprising wires 130 and 132, is spliced out to be connected to a terminal A''' at some distance from the cable.

The cable 128 has a metallic sheath about it which is grounded at various points which are indicated at 134, so that the wires 130 and 132 have a distributed capacitance thereto which is indicated by the dotted lines including capacitors 136 representative of such distributed capacitance.

The exposed parts of the wires 130 and 132 running to the terminal A''' may be subject to induction for their length or part thereof, and to minimize the effects of induced voltages, the terminal ends of the wires are provided with a neutralizing transformer 138 having windings 140 and 142 in the respective wires 130 and 132. The terminal ends of the windings are provided with a customary bridging circuit-path including grounding-capacitors 144 and 146, connected in series, with their joining connection grounded by conductor 148. The distributed capacitance of the wires in the cable, in effect, provides a grounding path for the exciting current for magnetizing the transformer 138 so that the system of Fig. 11 is analogous to the unbalanced system shown in Fig. 1.

The system of Fig. 11 utilizes one neutralizing transformer and the distributed capacitance of the pilot wires as part of the neutralizing arrangement, but in general, it is desirable to use neutralizing transformers at both ends of a pilot wire channel when the distributed capacitance is not negligible. However, the particular neutralizing arrangement to be chosen will depend upon the expected value of the longitudinal extraneously-produced voltage, and the resquired reduction thereof to tolerable or desired values.

While I have shown in by aforesaid application, and in this application, my neutralizing arrangements in several specific variations, it is obvious that other variations and combinations, such as, for example, the use of additional neutralizing transformers, are possible, incorporating the features and general principles underlying my invention.

I claim as my invention:

1. A pilot wire signalling system comprising spaced terminals and a pair of pilot wires therebetween, said pilot wires conducting signal current between said terminals, and being subject to longitudinal in-phase voltages, means for reducing the effects of said longitudinal in-phase voltages, said means comprising a neutralizing transformer including a pair of closely coupled windings, a winding of said neutralizing transformer being in each of said pilot wires, and circuit means on the pilot wire side of said terminals for causing said longitudinal voltages to produce an exciting current-flow in one of said pilot wires for magnetizing said neutralizing transformer whereby induced voltages are produced therein for opposing said longitudinal voltages, said circuit means having non-capacitive impedance only.

2. A pilot wire signalling system comprising spaced terminals and a pair of pilot wires therebetween, said pilot wires conducting signal current between said terminals, and being subject to longitudinal in-phase voltages, means for reducing the effects of said longitudinal in-phase voltages, said means comprising a neutralizing transformer including a pair of closely coupled windings, a winding of said neutralizing transformer being in each of said pilot wires, and circuit means on the pilot wire side of said terminals for causing said longitudinal voltages to produce an exciting current-flow in one of said pilot wires for magnetizing said neutralizing transformer whereby induced voltages are produced therein for opposing said longitudinal voltages, said circuit means having resistive impedance only.

3. A double-wire pilot-wire signalling channel, in combination with a neutralizing transformer having two mutually coupled windings connected in the respective wires, and circuit means for providing current-path means for current for magnetizing said neutralizing transformer, said circuit means comprising grounding means from one of said wires at opposite sides of said neutralizing transformer, and including a substantial length of said one wire therebetween, the other wire being substantially isolated from ground between the terminals of the signalling channel.

4. A double-wire pilot-wire signalling channel, in combination with a neutralizing transformer having two mutually coupled windings connected in the respective wires, and circuit means for providing current-path means for current for magnetizing said neutralizing transformer, said circuit means comprising grounding means, including capacitive impedance, from one of said wires at opposite sides of said neutralizing transformer, and including a substantial length of said one wire therebetween, the other wire being isolated from ground between the terminals of the signalling channel.

5. A double-wire pilot-wire signalling channel, in combination with a neutralizing transformer having two mutually coupled windings connected in the respective wires, and circuit means for providing current-path means for current for magnetizing said neutralizing transformer, said circuit means comprising a bridging circuit-path, including a balance-coil, across said wires at one side of said neutralizing transformer, a grounding-branch from an intermediate point on said bridging circuit-path, and circuit-completing means, on the other side of said neutralizing transformer, near the end of said pilot-wire channel, an appreciable portion of said signalling channel being between said neutralizing transformer and said circuit-completing means.

6. A double-wire pilot-wire signalling channel, in combination with a neutralizing transformer having two mutually coupled windings connected in the respective wires, and circuit means for providing current path means for current for magnetizing said neutralizing transformer, said circuit means comprising a bridging circuit-path including a balance-coil means across said wires near one end thereof, a bridging circuit-path including a balance-coil means across said wires near the other end thereof, said neutralizing transformer being between said balance-coil means, said circuit means further including grounding branch circuit means from intermediate points of each of said balance-coil means.

7. A pilot-wire signalling system comprising spaced terminals and a pair of pilot wires therebetween, said pilot wires conducting signal current between said terminals, and being subject to extraneously-produced voltages in the same direction, means for reducing the effects of said extraneously-produced voltages, said means comprising a plurality of spaced neutralizing transformers, each having two mutually coupled windings connected in the respective pilot wires, and circuit means for magnetizing said neutralizing transformers, said circuit means comprising grounding means from one of said pilot wires and including a substantial length of said one pilot wire, said grounding means comprising a pair of grounding branches near the respective ends of said one pilot wire, said plurality of neutralizing transformers being disposed between said grounding branches, said grounding branches having non-capacitive impedance only.

8. A pilot-wire signalling system comprising spaced terminals and a pair of pilot wires therebetween, said pilot wires conducting signal current between said terminals, and being subject to extraneously-produced voltages in the same direction, means for reducing the effects of said extraneously-produced voltages, said means comprising a plurality of spaced neutralizing transformers, each having two mutually coupled windings connected in the respective pilot wires, and circuit means for providing a current-flow path for magnetizing current for said neutralizing transformers, said circuit means comprising grounding means from one of said pilot wires, and including a substantial portion of said one pilot wire, said grounding means comprising a pair of grounding branches near the respective ends of said one pilot wire, said plurality of neutralizing transformers being disposed between said grounding branches, said grounding branches having resistance impedance only.

9. A double-wire pilot-wire signalling channel between terminals, in combination with a plurality of spaced neutralizing transformers each having mutually coupled windings connected in the respective wires, and circuit means for providing a current-flow path for magnetizing current for said plurality of neutralizing transformers, said circuit means comprising a pair of grounding means from one only of said wires, said plurality of neutralizing transformers being between said grounding means, the other wire being isolated from ground between the terminals of the signalling channel.

10. A double-wire pilot-wire signalling channel between terminals, in combination with a plurality of spaced neutralizing transformers each having mutually coupled windings connected in the respective wires, and circuit means for providing a current-flow path for magnetizing current for said plurality of neutralizing transformers, said circuit means comprising a pair of grounding means, including capacitive impedance, from one only of said wires, said plurality of neutralizing transformers being between said grounding means, the other wire being isolated from ground between the terminals of the signalling channel.

11. A double-wire pilot-wire signalling channel, in combination with a plurality of spaced neutralizing transformers each having mutually coupled windings connected in the respective wires, and circuit means for providing a current-flow path for magnetizing current for said plurality of neutralizing transformers, said circuit means comprising a pair of spaced bridging circuit-paths across said wires, each of said bridging circuit-paths including a balance-coil, and grounding means from an intermediate point on each of said bridging-circuit paths, said plurality of neutralizing transformers being between said bridging-circuit paths.

12. A double-wire pilot-wire signalling channel, in combination with a plurality of spaced neutralizing transformers each having mutually coupled windings connected in the respective wires, and circuit means for providing a current-path for magnetizing current for said plurality of neutralizing transformers, said circuit means comprising a bridging-circuit-path across said wires, including a balance-coil means, a grounding-branch from an intermediate point on said balance-coil means, and a ground circuit completing means, said plurality of transformers being between said balance-coil means and said ground circuit completing means.

13. The combination with a pilot-wire signalling system comprising spaced terminals, and a pair of pilot wires therebetween, said terminals having means for providing for signalling current-flow over each of said pilot wires, one of said pilot wires, between said terminals, being insulated from ground and having no grounding branch-paths; of neutralizing transformer means comprising a plurality of mutually coupled windings for the respective pilot wires, and circuit means, associated only with a second of said pilot wires and the associated winding thereof, for providing a circuit-path for exciting current-flow for magnetizing said neutralizing transformer means, to induce a voltage in each of said pilot wires, opposing the voltage causing said exciting-current-flow.

14. The combination with a pilot-wire system comprising spaced terminals, and a plurality of pilot wires therebetween, said terminals having means for providing for signalling current between said terminals over each of said pilot wires, one of said pilot wires, between said terminals, being isolated from ground and having no grounding-branch-paths; of neutralizing transformer means comprising a plurality of mutually coupled windings in the respective pilot wires, and circuit means, associated only with a second of said pilot wires and the associated winding thereof, for providing a circuit-path for exciting current-flow for magnetizing said neutralizing transformer means, to induce a voltage opposing the voltage causing said exciting current-flow, said circuit means comprising grounding-branch-paths from said second of said pilot wires, near each of said spaced terminals.

15. The combination with a pilot-wire system comprising spaced terminals, and a plurality of pairs of pilot wires therebetween, said terminals having means for providing for signalling current between said terminals over each of said pilot wires, one pair of said pilot wires, between said terminals, comprising a distinct signalling communication channel, said one pair of pilot wires being isolated from ground and having no grounding-branch-paths; of neutralizing transformer means comprising mutually coupled windings in the respective pilot wires, and circuit means, associated with a second pair of said pilot wires, for providing a path for current-flow for exciting-current for magntizing said neutralizing transformer means.

16. The combination with a pilot-wire system comprising spaced terminals, and a plurality of pairs of pilot wires therebetween, said terminals having means for providing for signalling current between said terminals over each of said pilot wires, one pair of said pilot wires, between said terminals, comprising a distinct signalling communication channel; of neutralizing transformer means comprising mutually coupled windings in the respective pilot wires, and circuit means, associated with a second pair of said pilot wires, for providing a path for current-flow for exciting-current for magnetizing said neutralizing transformer means.

17. The combination with a pilot-wire system comprising spaced terminals, and a plurality of pairs of pilot wires therebetwen, said terminals having means for providing for signalling current between said terminals over each of said pilot wires, one pair of said pilot wires, between said terminals, comprising a distinct signalling communication channel, said one pair of pilot wires being insulated from ground between said terminals and having no grounding-branch-paths thereto; of neutralizing transformer means comprising mutually coupled windings in the respective pilot wires, and circuit means, associated with a second pair of said pilot wires, for providing a path for current-flow for exciting-current for magnetizing said neutralizing transformer means, said circuit means including grounding-branch-paths from said second pair of pilot wires and near each of said terminals, said neutralizing transformer means being between said grounding-branch-paths.

18. A double-wire pilot-wire signalling channel, in combination with a single neutralizing transformer having two mutually coupled windings connected in the respective pilot wires, and circuit means for magnetizing current for said neutralizing transformer, said circuit means comprising grounding means from one of said pilot wires at opposite sides of said neutralizing transformer, said circuit means including, between said grounding means, a substantial portion of said one of said wires.

19. A double-wire pilot-wire signalling channel, in combination with a single neutralizing transformer having two mutually coupled windings connected in the respective pilot wires, and circuit means for magnetizing current for said neutralizing transformer, said circuit means comprising grounding means, including capacitive impedance, whereby said circuit means includes ground, said grounding means being at opposite sides of said neutralizing transformer, said circuit means including between said grounding means, a substantial portion of said pilot-wire channel.

20. A double-wire pilot-wire channel, in combination with a single neutralizing transformer having two mutually coupled windings connected in the respective pilot wires, and circuit means including relatively small grounding-capacitors associated with one of said pilot wires for providing a ground return path for a magnetizing current for said neutralizing transformer, the in-phase impedance of said circuit means being such that said magnetizing current is of relatively small magnitude but sufficient to excite said neutralizing transformer.

21. A wire signalling channel of extended length, said channel comprising a pair of pilot wires, said pair of pilot wires having, in effect, distributed capacity to ground along a portion thereof; in combination with a neutralizing transformer having two mutually coupled windings connected in the respective pilot wires, and circuit means from said pair of pilot wires on the side of said neutralizing transformer opposite to that on which the said portion of the pilot wires is connected, for completing a circuit-path to ground for magnetizing current for said neutralizing transformer.

22. A wire signalling channel of extended length, said channel comprising a pair of pilot wires, said pair of pilot wires having, in effect, distributed capacity to ground along a portion thereof; in combination with a neutralizing transformer having two mutually coupled windings connected in the respective pilot wires, and circuit means including grounding capacitors from the respective pilot wires of said pair of pilot wires on the side of said neutralizing transformer opposite to that on which the said portion of the pilot wires is connected, for completing a ground return path for magnetizing current for said neutralizing transformer.

EDWIN L. HARDER.